US010838982B2

(12) United States Patent
Alberg et al.

(10) Patent No.: US 10,838,982 B2
(45) Date of Patent: Nov. 17, 2020

(54) SYSTEM AND METHOD FOR AGGREGATING VALUES THROUGH RISK DIMENSION HIERARCHIES IN A MULTIDIMENSIONAL DATABASE ENVIRONMENT

(71) Applicant: ORACLE INTERNATIONAL CORPORATION, Redwood Shores, CA (US)

(72) Inventors: Dima Alberg, Be'er Sheva (IL); Victor Belyaev, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 888 days.

(21) Appl. No.: 15/332,802

(22) Filed: Oct. 24, 2016

(65) Prior Publication Data

US 2017/0116308 A1 Apr. 27, 2017

Related U.S. Application Data

(60) Provisional application No. 62/245,902, filed on Oct. 23, 2015.

(51) Int. Cl.
*G06F 16/00* (2019.01)
*G06F 16/28* (2019.01)
(Continued)

(52) U.S. Cl.
CPC ...... *G06F 16/283* (2019.01); *G06F 16/24556* (2019.01); *G06Q 10/0635* (2013.01)

(58) Field of Classification Search
CPC .................. G06F 16/24556; G06F 16/283
(Continued)

(56) References Cited

U.S. PATENT DOCUMENTS 7,010,495 B1 * 3/2006 Samra ............... G06Q 10/0635
705/14.41
8,050,959 B1 * 11/2011 Erdman ............ G06Q 10/0635
705/7.28
(Continued)

OTHER PUBLICATIONS

Oracle®, Oracle® Essbase Release 11.1.1, Database Administrator's Guide, Oracle® Enterprise Performance Management System, Copyright © 1996, 2008, 1182 pages.
(Continued)

*Primary Examiner* — Michelle N Owyang
(74) *Attorney, Agent, or Firm* — Tucker Ellis LLP (57) ABSTRACT

In accordance with an embodiment, described herein is a system and method for aggregating values through risk dimension hierarchies to create risk models in a multidimensional database. The system can include a cube that stores a plurality of standard risk measures organized into different risk dimension hierarchies, and a pluggable calculation engine executing a plurality of scripts to dynamically operate on any value in the cube. The system can aggregate values through the plurality of risk dimensional hierarchies, and either store an aggregated value against a dimension member, or dynamically calculate the aggregated value on demand. By aggregating values through the risk dimension hierarchies, a plurality of risk models can be built to measure a variety of risks.

17 Claims, 7 Drawing Sheets

(51) Int. Cl.
*G06F 16/2455* (2019.01)
*G06Q 10/06* (2012.01)

(58) Field of Classification Search
USPC .................................................. 707/600–899
See application file for complete search history.

(56) References Cited

U.S. PATENT DOCUMENTS

| | | | |
|---|---|---|---|
| 8,694,540 B1 * | 4/2014 | Lin ....................... | G06F 16/211 707/777 |
| 2003/0149657 A1 * | 8/2003 | Reynolds ............... | G06Q 40/08 705/38 |
| 2003/0172017 A1 * | 9/2003 | Feingold ................ | G06Q 40/00 705/35 |
| 2003/0195830 A1 * | 10/2003 | Merkoulovitch ...... | G06Q 40/08 705/36 R |
| 2008/0021801 A1 * | 1/2008 | Song ....................... | G06Q 40/00 705/35 |
| 2009/0276259 A1 * | 11/2009 | Bliznak ................ | G06Q 10/06 705/7.28 |
| 2014/0279824 A1 * | 9/2014 | Tamayo ................ | G06Q 10/06 707/600 |
| 2015/0193699 A1 * | 7/2015 | Kil .......................... | G06Q 10/04 706/12 |
| 2015/0248644 A1 * | 9/2015 | Zenger ................. | G06Q 10/105 705/320 |
| 2016/0259832 A1 * | 9/2016 | Shore .................... | G06F 16/283 |
| 2016/0267231 A1 * | 9/2016 | Gunjan ................. | G06F 19/328 |
| 2016/0300252 A1 * | 10/2016 | Frank ................. | G06F 16/24578 |

OTHER PUBLICATIONS

Oracle©, Oracle Business Intelligence Foundation Suite, Technical Overview, Jan. 2011, © Oracle 2011, 56 pages.

* cited by examiner

SYSTEM AND METHOD FOR AGGREGATING VALUES THROUGH RISK DIMENSION HIERARCHIES IN A MULTIDIMENSIONAL DATABASE ENVIRONMENT

CLAIM OF PRIORITY

This application claims the benefit of priority to U.S. Provisional Application titled "SYSTEM AND METHOD FOR AGGREGATING HIERARCHICAL VALUES AT RISK MEASURES CALCULATION IN A MULTIDIMENSIONAL DATABASE", Application No. 62/245,902, filed Oct. 23, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to a system and method for aggregating values through risk dimension hierarchies to create risk models.

BACKGROUND

A multidimensional database can store various widely-accepted standard risk models that can be used by investment professionals to quantify market risks related to their financial portfolios. Although some risk models, for example, Value at Risk (VaR) and Credit Value at Risk (CVaR), can provide standard risk measures, for example, market risks and credit risks; it is desirable to build risk new models to calculate all risks associated with an investment portfolio. However, a multidimensional database may not typically support efficient aggregation of values through previously predefined risk dimensional hierarchies, which makes it difficult to build new risk models using existing risk measures.

SUMMARY

In accordance with an embodiment, described herein is a system and method for aggregating values through risk dimension hierarchies to create risk models in a multidimensional database. The system can include a cube that stores a plurality of standard risk measures organized into different risk dimension hierarchies, and a pluggable calculation engine executing a plurality of scripts to dynamically operate on any value in the cube. The system can aggregate values through the plurality of risk dimensional hierarchies, and either store an aggregated value against a dimension member, or dynamically calculate the aggregated value on demand. By aggregating values through the risk dimension hierarchies, a plurality of risk models can be built to measure operational, liquidity and legal risks. The risk models can be evaluated, validated, and updated with up-to-date market information.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
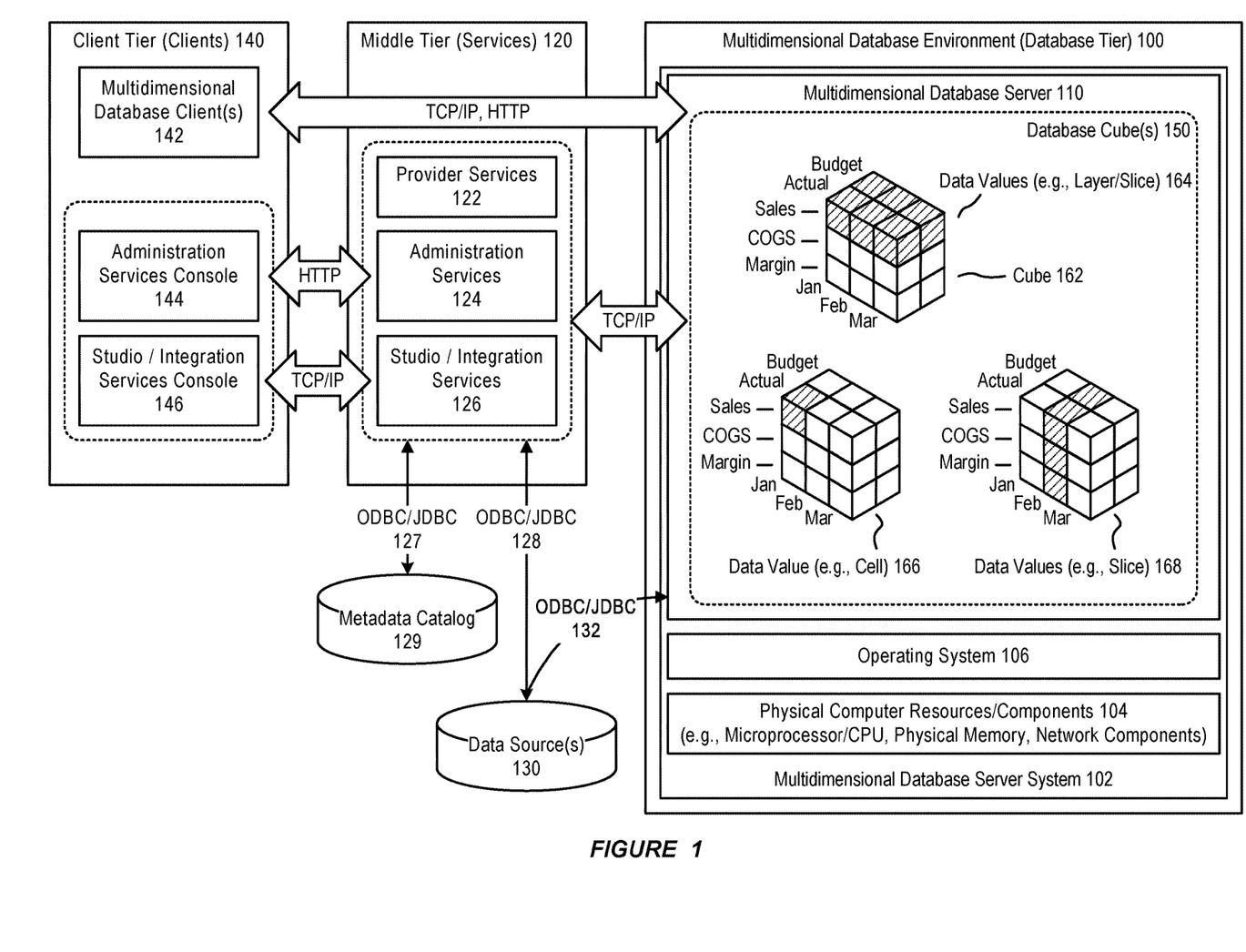
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142

(e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-In

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Aggregating Values Through Risk Dimension Hierarchies (5701US1)

A multidimensional database can store various widely-accepted standard risk models that can be used by investment professionals to quantify market risks related to their financial portfolios. The standard risk models, for example, Value at Risk (VaR) and Credit Value at Risk (CVaR), can provide standard risk measures, for example, market risks and credit risks.

However, the widely-accepted standard risk models may not include risk models to measure operational, liquidity or legal risks. Operational risk represents the risk of losing money due to operational failure, for example, power failures, IT systems crashes, staff problems like strike, and illness. Legal risk represents the risk of losing money when financial contracts are not enforceable. Liquidity risk represents the risk that a company may be unable to meet short term financial demands, for example, due to inability to convert a security or hard asset to cash without a loss of capital and/or income in the process.

For financial institutions, it is important to build risk models to induce risk measures to calculate all risks, so that risks associated with financial portfolios can be accurately and timely measured. However, the operational, legal, and liquidity risks are hard to quantify in a multidimensional database which does not typically support efficient aggregation of values through previously predefined risk dimensional hierarchies.

In accordance with an embodiment, the system and method described herein provides a multidimensional database platform for users to build additional risk models to more accurately measure risks associated with a financial portfolio.

As used herein, in accordance with an embodiment, a risk model can represent a statistical/mathematical formula, or a prediction tree/rules set induced from historical data and a forecasting algorithm, and that can be generated by customized R functions.

In accordance with an embodiment, R is a programming language and environment for statistical computing and graphics, and provides a wide variety of statistical and graphical techniques, and is highly extensible.

In accordance with an embodiment, the system described herein can aggregate values through risk dimension hierarchies to create risk models in a multidimensional database. The system can include a cube that stores a plurality of standard risk measures organized into different risk dimension hierarchies, and a pluggable calculation engine executing a plurality of scripts to dynamically operate on any value in the cube. The system can aggregate values through the plurality of risk dimensional hierarchies, and either store an aggregated value against a dimension member, or dynamically calculate the aggregated value on demand. By aggregating values through the risk dimension hierarchies, a plurality of risk models can be built to measure operational, liquidity and legal risks. The risk models can be evaluated, validated, and updated with up-to-date market information.

In accordance with an embodiment, the calculation engine can be a R calculation engine, and each of the plurality of customized functions can be an R function written in one or more R scripts. The R calculation engine can encapsulate connectivity between a multidimensional database server and the R calculation engine, and allows R scripts to be triggered from within the multidimensional database server, and to be embedded into another calculation script. The R calculation engine can additionally retrieve, prepare, and transform data and metadata from the multidimensional database server, and use the data and metadata to build various risk models. The various risk models, after being validated and updated, can be saved by the R calculation engine to a risk models catalog, from which a user can retrieve the risk models to build forecasts.

In accordance with an embodiment, the system can be used to aggregate the up-to-date risk measures at the end of each trading day with the latest market and portfolio information for use in a plurality of risk models, including the newly built risk models and a plurality of standard risk models.

Figure 2:
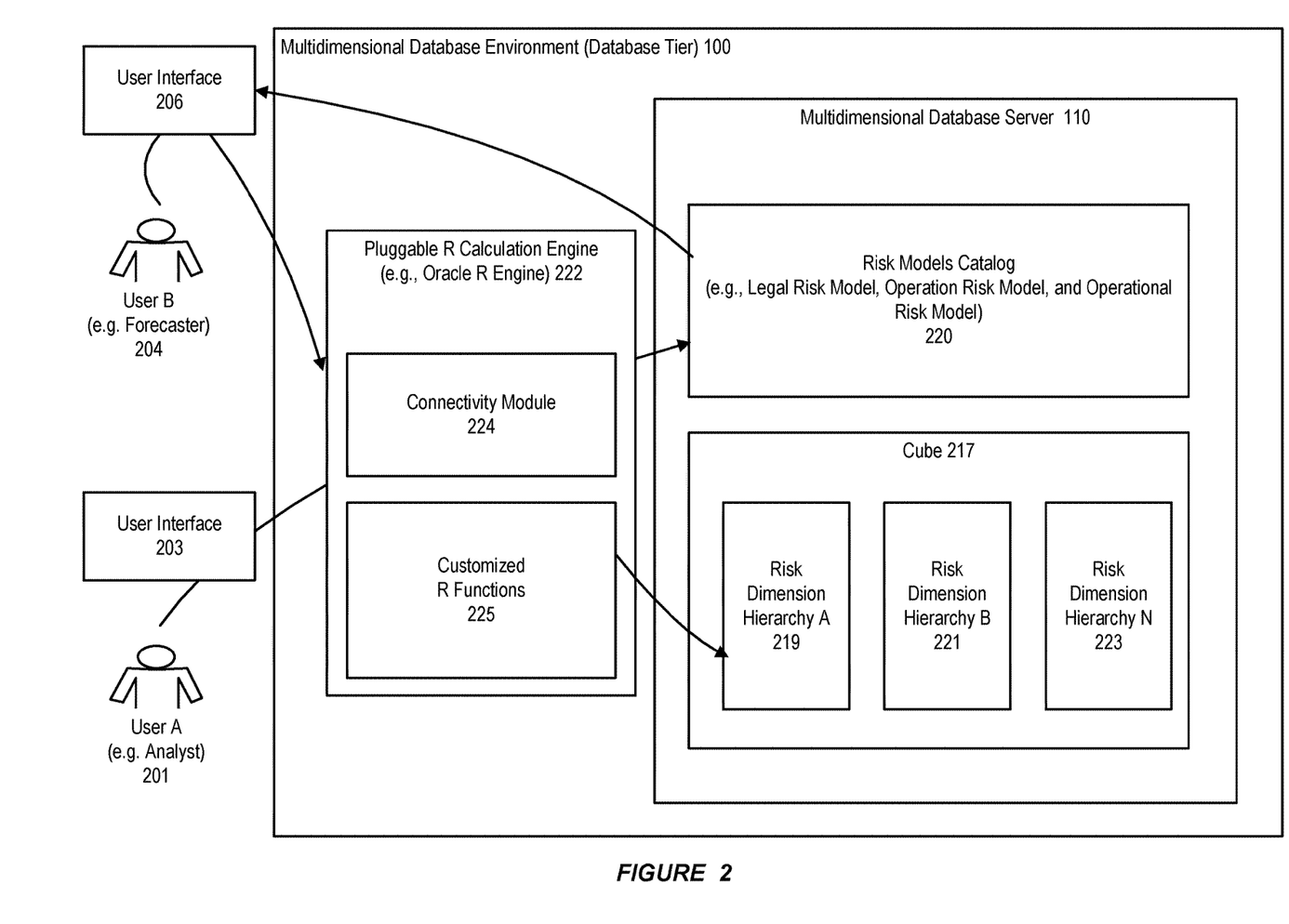
FIG. 2 illustrates a system for aggregating values through risk dimension hierarchies to create risk models in a multidimensional database environment, in accordance with an embodiment.

FIG. 2 illustrates a system for aggregating values through risk dimension hierarchies to create risk models in a multi-dimensional database environment, in accordance with an embodiment.

As shown in FIG. 2, the system can include a cube 217 that stores various risk measures organized into a plurality of risk dimension hierarchies, for example, risk dimension hierarchy A 219, risk dimension hierarchy B 221, and risk dimension hierarchy N 223.

In accordance with an embodiment, the risk measures can be used in a plurality of standard risk models, example of which can include Hierarchical Value at Risk (HVaR) measures model, hierarchical portfolio optimization analysis, scenario analysis, stress testing, current exposure analysis, potential exposure analysis, credit rating migration analysis, descriptive statistics, cash flow analysis, and portfolio optimization analysis.

As further shown in FIG. 2, a pluggable R calculation engine 222 can include a connectivity module 224 that can encapsulate connectivity between the R calculation engine and the multidimensional database server 211; and a plurality of customized R functions 225 configured to dynamically operate on any value in the plurality of risk dimension hierarchies, and aggregate values through the plurality of risk dimension hierarchies, thereby inducing new risk measures to measure operational, legal, and liquidity risks that are not measured by the plurality of standard risk models.

In accordance with an embodiment, one or more of the plurality of customized R functions can be triggered by user A (for example, an analyst) 201 via a user interface 203 to construct and validate risk models, and save the validated risk models into a risk models catalog 220. One or more the plurality of customized R functions can be triggered by user B (for example, a forecaster) 204 via a user interface 206 to build and validate forecasts using the risk models, and export (write back) the forecasts into the multidimensional database server.

Figure 3:
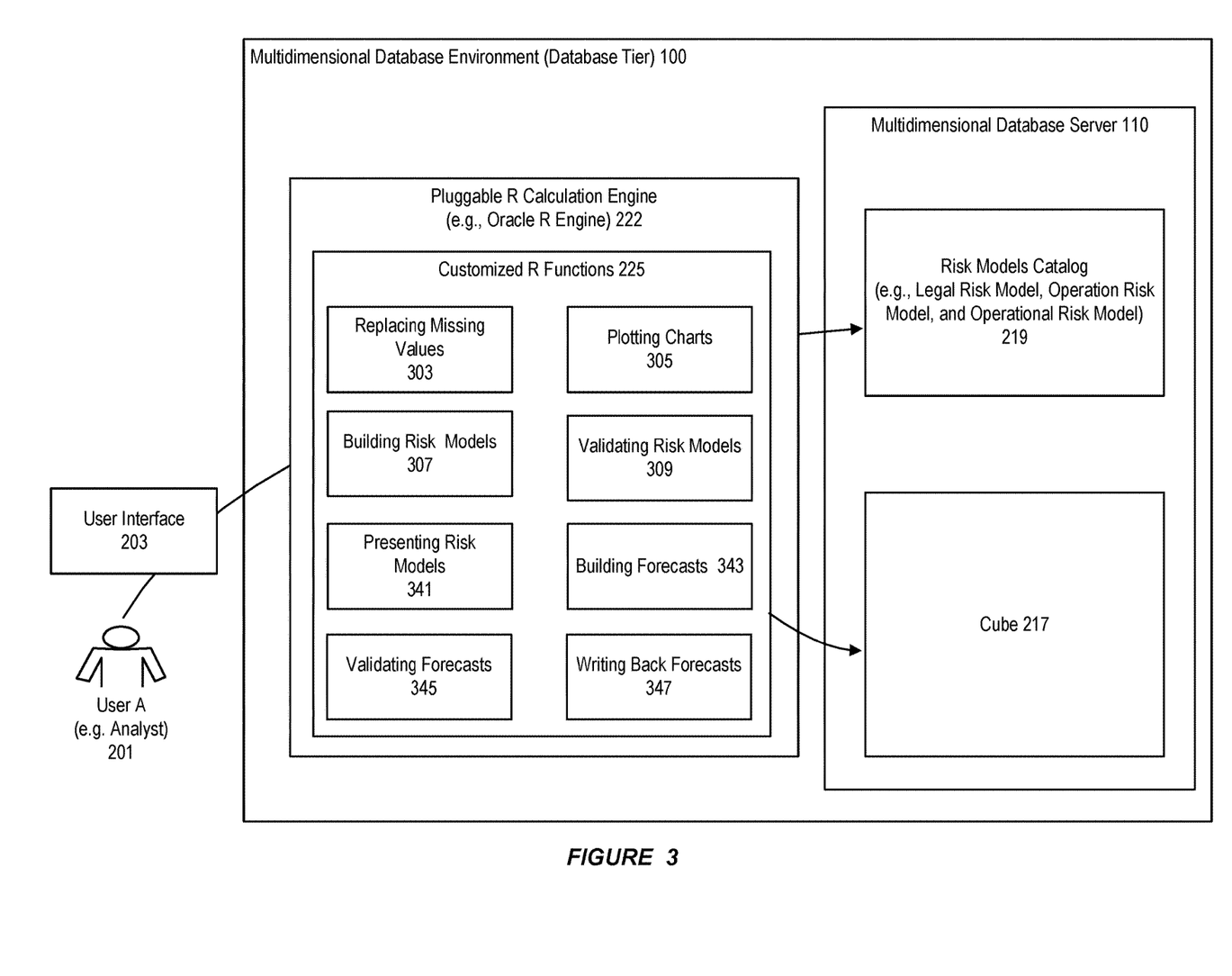
FIG. 3 further illustrates a system for aggregating values through risk dimension hierarchies to create risk models in a multidimensional database environment, in accordance with an embodiment.

FIG. 3 further illustrates a system for aggregating values through risk dimension hierarchies to create risk models in a multidimensional database environment, in accordance with an embodiment.

More particularly, FIG. 3 shows the plurality of customized R functions can include an R function for replacing missing values 303, an R function for plotting charts 305, an R function for building risk models 307, an R function for validating risk models 309, an R function for presenting risk models 341, an R function for building forecasts 343, an R function for validating forecasts 345, and an R function for writing back forecasts 347.

In accordance with an embodiment, the R function for replacing missing values can be used by an analyst to take appropriate actions to missing values in an R data frame, which can represent a data structure with a list of vectors for storing data. The R function for replacing missing values can encapsulate various techniques, for example, deletion and substitution, for handling missing values in an R data frame in a single function.

When building a risk model using the R function for building risk models, an analyst can select a forecasting algorithm, and provide the selected forecasting algorithm as a parameter to run the R function for building risk models.

Examples of forecasting algorithms can include quantitative algorithms, for example, Simple Moving Average Technique, Regression, Exponentially Weighted Moving Average (EWMA), and Holt-Winters; and qualitative algorithms, for example, Prediction Rules, Prediction Net, and Decision Tree Recommended System.

As described above, a risk model can be build from historical data and a forecasting algorithm. In accordance with an embodiment, the historical data used to generate a risk model can be part (for example, 70%) of values aggregated through the plurality of risk dimension hierarchies. The part of the data can be prepared and transformed by the R calculation engine, with missing values replaced, for use to build the risk models.

In accordance accordance with an embodiment, the rest of the data (e.g., 30%) can be used to test the risk model generated by the R function for building risk models.

For example, a generated risk model can be applied to the rest of the data, to determine whether the risk model provides an accurate backward forecasting accuracy. The R function for validating risk models can be triggered for the testing.

In accordance with an embodiment, the analyst can invoke the R function for validating forecasts to determine forecasting accuracy of a risk model by comparing its forecasting results with the forecasting result of a baseline risk model previously defined by a forecaster, and/or other forecasting control standards.

In accordance with an embodiment, a risk model with a corresponding data can be saved an XML file using the R function for saving risk models.

Figure 4:
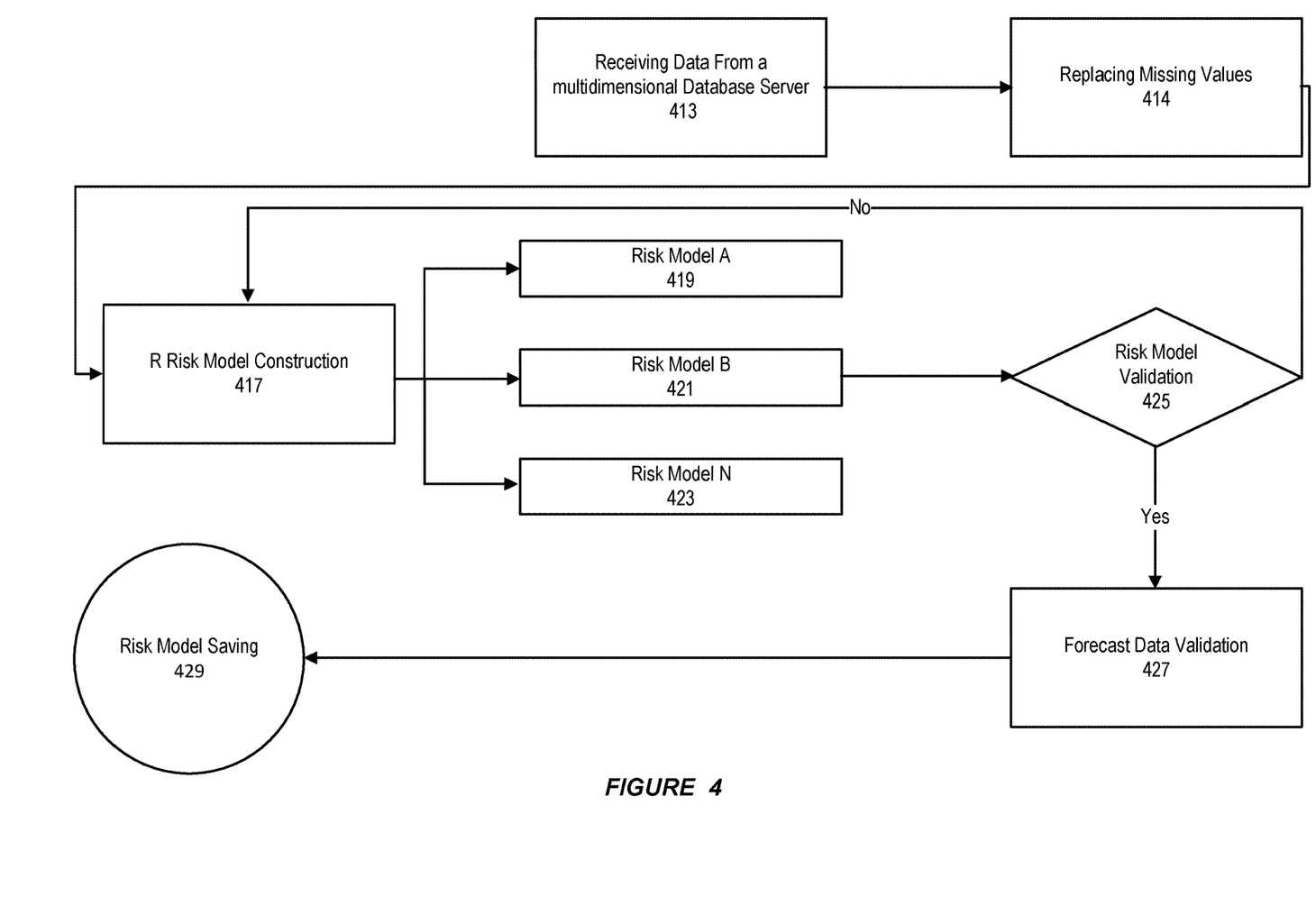
FIG. 4 illustrates a flow chart for building a risk model, in accordance with an embodiment.

FIG. 4 illustrates building a risk model, in accordance with an embodiment.

At step 413, in response to a multidimensional expressions (MDX) query request, an R calculation engine can connect to the multidimensional database server, and receive data that has been converted into an R multidimensional data matrix.

At step 414, the imported data can be prepared, cleaned, with missing data replaced.

At step 417, the R calculation engine can trigger an R function to generate a risk model based on a particular R forecasting algorithm selected, and a first part of the data received from the multidimensional database server. For example, the risk model generated can be a risk model A 419, risk model B 421, or risk model N 423.

At step 425, the R calculation engine can validate the generated risk model by applying the risk model to a second part of the data, to determine whether the risk model provides an accurate backward forecasting. If the risk does not provide an accuracy that meet a pre-defined standard in terms of confidence level, the R function for building risk models can be triggered with a different R forecasting algorithm and/or a different set of data. The process can be repeated until the pre-defined standard is met.

At step 427, the R calculation engine can compare the forecasting accuracy of the risk model with that of a baseline model. If the accuracy is acceptable, the risk model can be saved 429 to a risk models catalog in the multidimensional database server.

Figure 5:
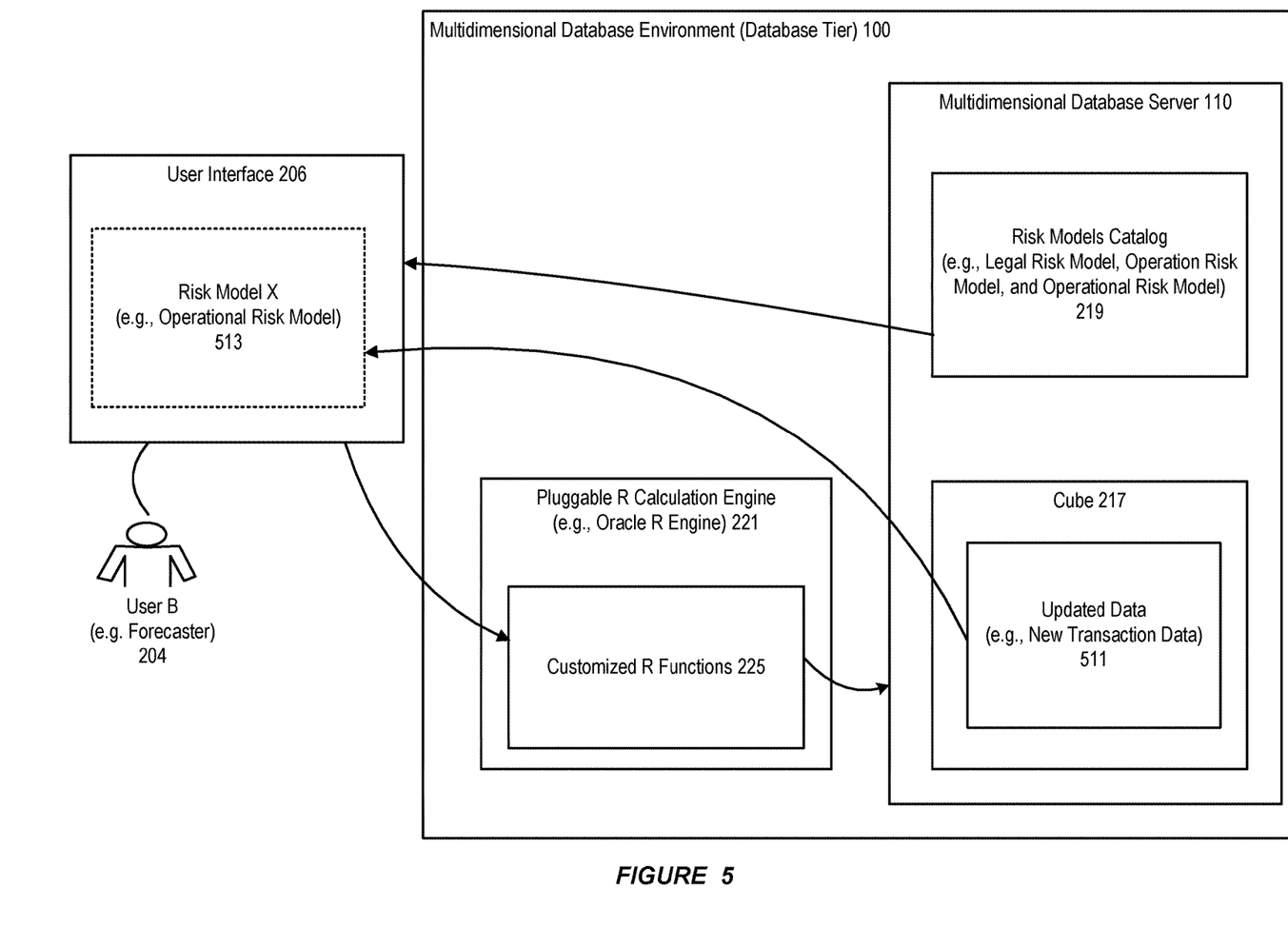
FIG. 5 further illustrates a system for aggregating values through risk dimension hierarchies to create risk models in a multidimensional database environment, in accordance with an embodiment.

FIG. 5 further illustrates a system for aggregating values through risk dimension hierarchies to create risk models in a multidimensional database environment, in accordance with an embodiment.

As shown in FIG. 5, a generated risk models and a name of the cube in the multidimensional database server can be displayed to user B.

In accordance an embodiment, the system can suggest to user B a valid risk model based on a plurality of data pivots in the cube, where the plurality of data pivots can be selected based on a particular forecast to be created.

In accordance with an embodiment, the suggested risk model, for example, risk model X 513, can be validated by the system to determine whether the risk model is up to date, and fits to the selected data pivots. During the risk model validation, the R function for replacing missing values can be triggered to replace any missing values in the selected data pivots.

In accordance with an embodiment, user B can use the selected risk model to generate forecasts using updated data 511 in the cube. For example, the updated data can include aggregated risk measures at the end of the current trading day.

In accordance with an embodiment, the generated forecasting values can be compared with actual values to determine whether the forecasting values are accurate in terms of a particular confidence level. If they are accurate, data associated with the generated forecasts can be written back (exported) to a corresponding application in the multidimensional database server. Otherwise, an alternative risk model can be used. If none of the risk models can generate the accurate forecasts, user B (e.g., a forecaster) can ask user A (e.g., an analyst) to add, update or reproduce the corresponding risk models.

Figure 6:
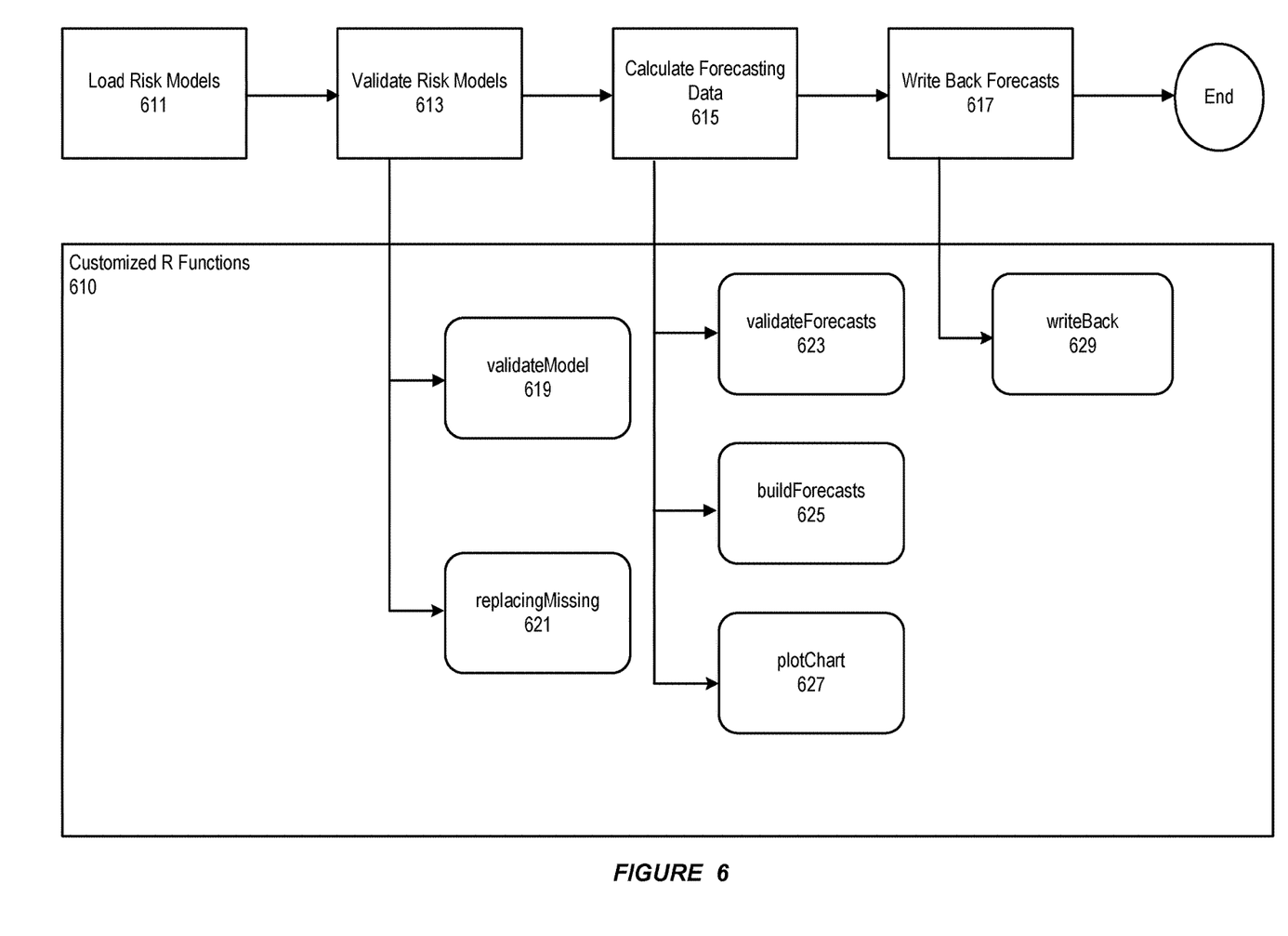
FIG. 6 illustrates a flow chart for preparing a forecast using a risk model, in accordance with an embodiment.

FIG. 6 illustrates preparing a forecast using a risk model, in accordance with an embodiment.

In accordance with an embodiment, a plurality of customized R functions 610 used for preparing risk models can be triggered in response to a forecaster preparing a forecast.

As shown in FIG. 6, at step 611, the plurality of risk models can be loaded from a risk models catalog to be displayed in a user interface At step 613, a particular risk model can be selected by a forecaster or suggested by the system to the forecaster based on data pivots on which forecasts need to be generated. As shown in FIG. 6, the R function for validating risk models 619 and the R function for replacing missing values 621 can be triggered at this step.

At step 615, the particular risk model that has been validated can be used by the forecaster to calculate forecasting data. The R function for building forecasts 625, the R function for validating forecasts 623 and the R function for plotting charts 627 can be triggered at this step.

At step 617, calculated forecasting data can be written back (exported) to a corresponding application in the multidimensional database server. The function R function for writing back 629 forecasts can be triggered at this step.

Figure 7:
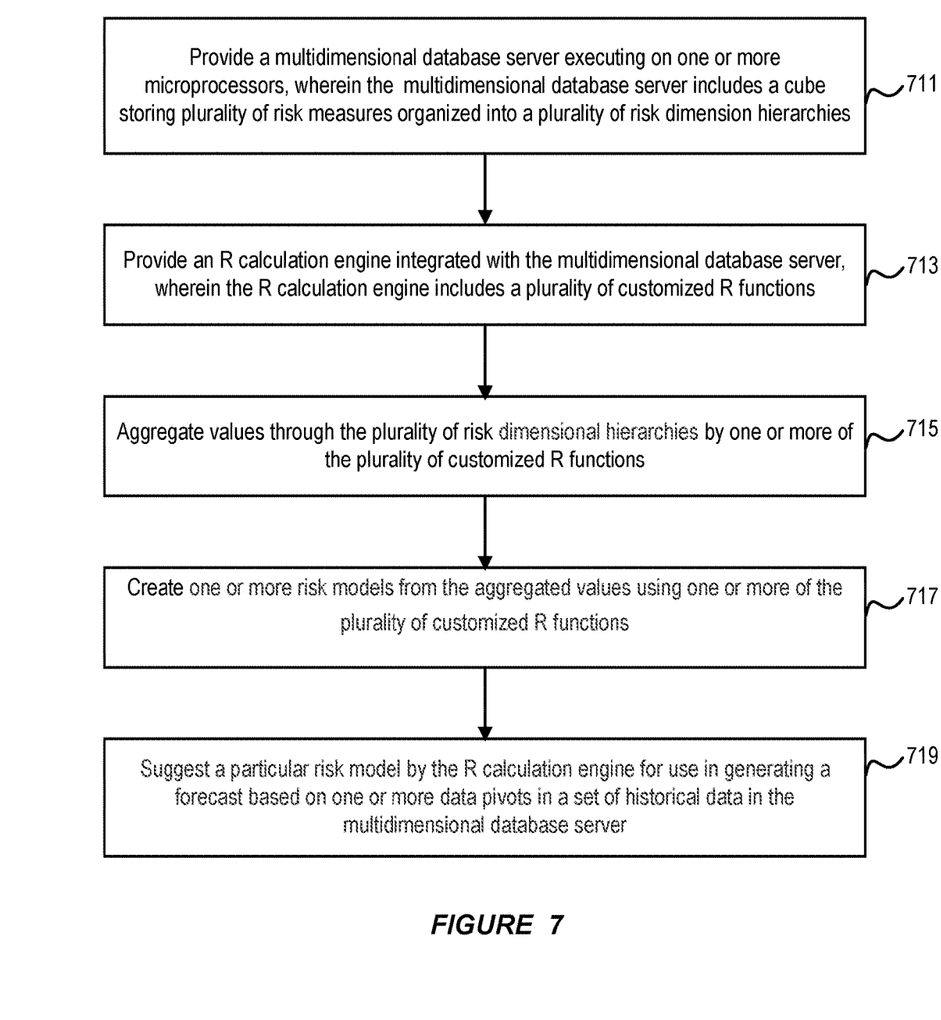
FIG. 7 illustrates a method for aggregating values through risk dimension hierarchies to create risk models in a multidimensional database environment, in accordance with an embodiment.

FIG. 7 illustrates a method for aggregating values through risk dimension hierarchies to create risk models in a multidimensional database environment, in accordance with an embodiment.

As shown in FIG. 7, at step 711, a multidimensional database server executing on one or more microprocessors is provided, wherein the multidimensional database server includes a cube storing plurality of risk measures organized into a plurality of risk dimension hierarchies.

At step 713, an R calculation engine is integrated with the multidimensional database server, wherein the R calculation engine includes a plurality of customized R functions.

At step 715, one or more customized R functions are used to aggregate values through the plurality of risk dimensional hierarchies.

At step 717, one or more risk are created from the aggregated values using one or more of the plurality of customized R functions.

At step 719, a particular risk model is suggested by the R calculation engine for use in generating a forecast based on one or more data pivots in a set of historical data in the multidimensional database server.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVDs, CD-ROMs, microdrives, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for creating risk models by aggregating values through risk dimension hierarchies in a multidimensional database, comprising:
a computer that includes one or more microprocessors;
a multidimensional database server executing on the computer, wherein the multidimensional database server includes a cube storing plurality of risk measures organized into a plurality of risk dimension hierarchies;
a calculation engine integrated with the multidimensional database server, wherein the calculation engine includes a plurality of customized functions configured to:
aggregate values through the plurality of risk dimensional hierarchies, create one or more risk models from the aggregated values, wherein, to create each risk model of the one or more risk models, the plurality of customized functions are further configured to:
build the risk model based on a selected forecasting algorithm and a first portion of the aggregated values;
validate the risk model based on a second portion of the aggregated values; and
save the risk model to a risk model catalog in the multidimensional database server;
suggest a particular risk model from the risk model catalog; and
generate, by the calculation engine, a forecast based on the particular risk model suggested and one or more data pivots in a set of historical data in the multidimensional database server.

2. The system of claim 1, wherein the calculation engine is an R calculation engine, and wherein the plurality of customized functions are R functions.

3. The system of claim 1, wherein the one or more risk models can include one or more of an operational risk model, a legal risk model, and a liquidity risk model.

4. The system of claim 1, wherein the plurality of customized functions are configured to dynamically operate on any value in the plurality of risk dimension hierarchies.

5. The system of claim 1, wherein one or more of the plurality of customized functions are triggered for use in preparing the one or more risk models and in using the one or more risk models for forecasting.

6. The system of claim 1, wherein aggregated values received by the calculation engine from the multidimensional server are in a format of an R multidimensional data matrix.

7. A method for creating risk models by aggregating values through risk dimension hierarchies in a multidimensional database, comprising:
providing a multidimensional database server executing on one or more microprocessors, wherein the multidimensional database server includes a cube storing plurality of risk measures organized into a plurality of risk dimension hierarchies;
providing a calculation engine integrated with the multidimensional database server, wherein the calculation engine includes a plurality of customized functions;
aggregating values through the plurality of risk dimensional hierarchies by one or more of the plurality of customized functions;
creating one or more risk models from the aggregated values using one or more of the plurality of customized functions, wherein creating a risk model includes:
building the risk model based on a selected forecasting algorithm and a first portion of the aggregated values;
validating the risk model based on a second portion of the aggregated values; and
saving the risk model to a risk model catalog in the multidimensional database server;
suggesting a particular risk model from the risk model catalog; and
generating, by the calculation engine, a forecast using the particular risk model suggested and based on one or more data pivots in a set of historical data in the multidimensional database server.

8. The method of claim 7, wherein the calculation engine is an R calculation engine, and wherein the plurality of customized functions are R functions.

9. The method of claim 7, wherein the one or more risk models can include one or more of an operational risk model, a legal risk model, and a liquidity risk model.

10. The method of claim 7, wherein the plurality of customized functions are configured to dynamically operate on any value in the plurality of risk dimension hierarchies.

11. The method of claim 7, wherein one or more of the plurality of customized functions are triggered for use in preparing the one or more risk models and in using the one or more risk models for forecasting.

12. The method of claim 7, wherein aggregated values received by the calculation engine from the multidimensional server are in a format of an R multidimensional data matrix.

13. A non-transitory computer readable storage medium, including instructions stored thereon which when read and executed by one or more computers cause the one or more computers to perform the steps comprising:
providing a multidimensional database server executing on one or more microprocessors, wherein the multidimensional database server includes a cube storing plurality of risk measures organized into a plurality of risk dimension hierarchies;
providing a calculation engine integrated with the multidimensional database server, wherein the calculation engine includes a plurality of customized functions;
aggregating values through the plurality of risk dimensional hierarchies by one or more of the plurality of customized functions;
creating one or more risk models from the aggregated values using one or more of the plurality of customized functions, wherein creating a risk model includes:
building the risk model based on a selected forecasting algorithm and a first portion of the aggregated values;
validating the risk model based on a second portion of the aggregated values; and
saving the risk model to a risk model catalog in the multidimensional database server;
suggesting a particular risk model from the risk model catalog; and
generating, by the calculation engine, a forecast with the particular risk model suggested and based on one or more data pivots in a set of historical data in the multidimensional database server.

14. The non-transitory computer readable storage medium of claim 13, wherein the calculation engine is an R calculation engine, and wherein the plurality of customized functions are R functions.

15. The non-transitory computer readable storage medium of claim 13, wherein the one or more risk models can include one or more of an operational risk model, a legal risk model, and a liquidity risk model.

16. The non-transitory computer readable storage medium of claim 13, wherein the plurality of customized functions are configured to dynamically operate on any value in the plurality of risk dimension hierarchies.

17. The non-transitory computer readable storage medium of claim 13, wherein one or more of the plurality of customized functions are triggered for use in preparing the one or more risk models and in using the one or more risk models for forecasting.

* * * * *